United States Patent Office 3,335,414
Patented Aug. 8, 1967

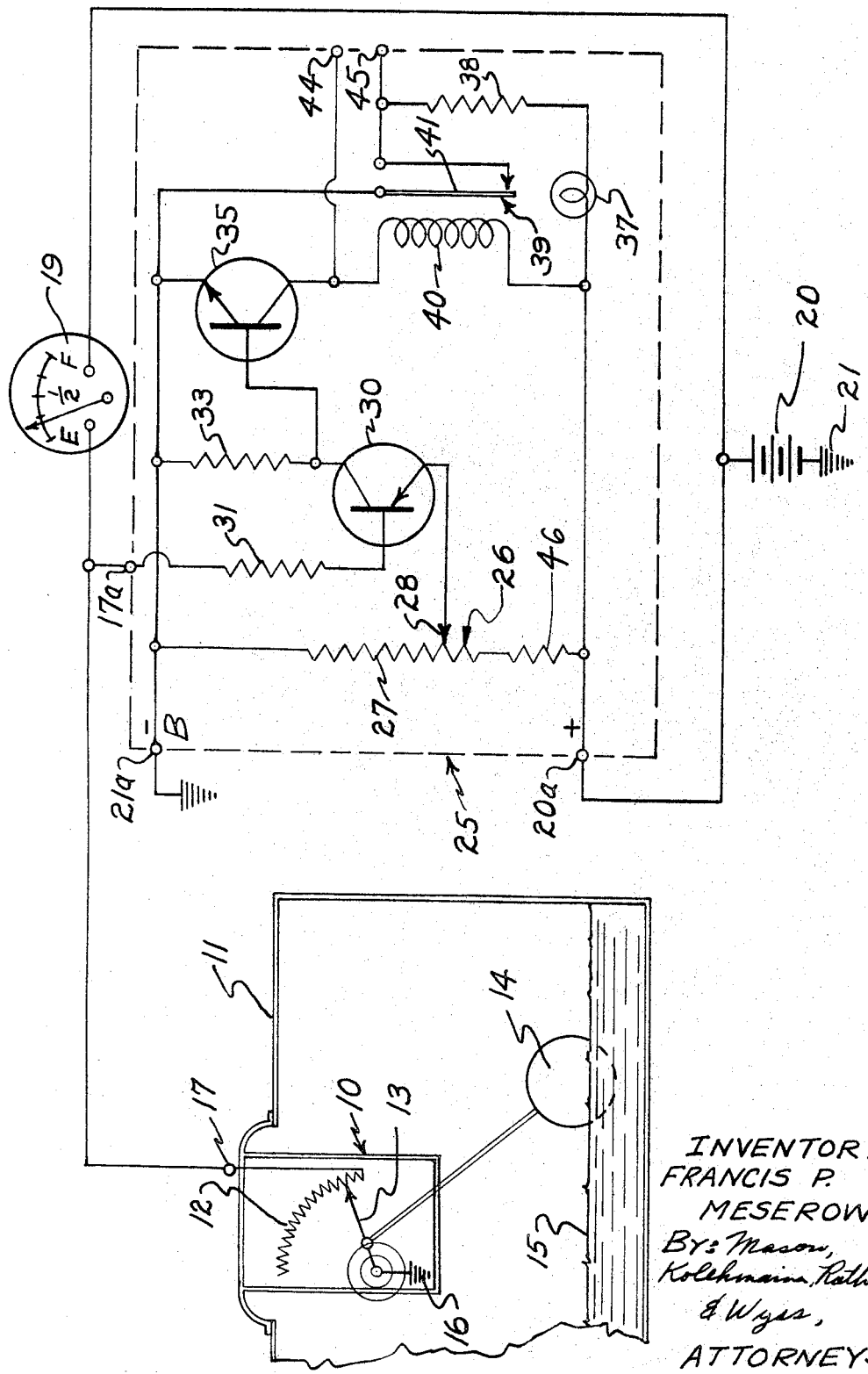

3,335,414
CRITICAL CONDITION WARNING DEVICE
Francis P. Meserow, 2605 W. Armitage Ave.,
Chicago, Ill. 60647
Filed Oct. 21, 1965, Ser. No. 499,846
11 Claims. (Cl. 340—181)

This invention relates to a critical condition warning device, and, more particularly, to a warning device to indicate or signal a low fuel level in the fuel supply of an internal combustion vehicle. Although the warning device is particularly suited for warning of a low fuel level in automobiles, it is equally effective to use in trucks, buses, boats, construction machinery, and other equipment wherein a fuel supply is used up and requires periodic refilling.

There are several different types of fuel gages presently used commercially on automobiles. The commercial fuel gage system conventionally operates by a float in the fuel tank, changing the current in the gage system by varying a resistance element such as a potentiometer or rheostat. In either case, a modulated voltage is applied to the indicating meter as a function of the level of the fuel in the tank. Moreover certain of the fuel level indicating systems employ magnetic meters and certain of the systems presently available employ thermal meters. Additionally, the modulated voltage applied to the meter, while varying between zero and some maximum, may either provide a zero modulated voltage when the tank is empty with the maximum voltage when the tank is full of fuel, or provide a zero modulated voltage when the tank is full with a maximum modulated voltage when the fuel tank is empty.

In spite of the fact that the fuel level in the tank can be quickly ascertained by means of the fuel indicating meter normally provided by the manufacturer of the vehicle, nevertheless thousands of motorists run out of fuel each day. These mishaps are due to a variety of factors, such as lack of vigilance, preoccupation with other problems, lack of foresight, incapability of judging the amount of fuel, and other causes.

Accordingly it is an object of the present invention to provide a new and improved warning indicator to the operator of a vehicle for indicating a critical low level of fuel in his fuel tank thus forewarning him in sufficient time to rectify the condition.

Another object of the present invention is the provision of a low fuel level warning device which may be readily installed on existing electrical indicating systems as well as incorporation into new vehicles.

An additional object of the invention is to provide a low fuel level warning device that is easily installed in existing automobiles with only the use of ordinary handtools and which does not require extensive remodeling to existing equipment.

Another object of the present invention is to provide a simple and inexpensive low fuel level warning device.

A further object of the present invention is to provide a new and improved low fuel level warning device which is capable of adaptation to cars having different types of fuel indicating systems.

In accordance with these and other objects, there is provided a new and improved signaling apparatus for association with an electrical fuel level indicating system of an automobile or other equipment of the type provided with a fuel sensing device providing a modulated voltage circuit responsive to the physical level of the fuel and providing a modulated voltage variable between upper and lower voltage limits. It will be understood that the signaling apparatus according to the present invention will sense a critical value of modulated voltage between the upper and lower voltage limits and representing a critical low fuel level to visibly or audibly warn the motorist of the low fuel condition. The signaling apparatus includes a voltage means such as a potentiometer for providing a comparison voltage compared to the critical voltage produced by the fuel sensing device. A first transistor is provided for connection with the comparison voltage and the modulating voltage so that when the modulating voltage reaches the value of the critical voltage, the transistor will become conducting to provide a load circuit which will be effective to actuate the signal.

In a preferred embodiment of the invention, there is provided a second transistor controlled by the output of the first transistor, and the signal device includes an indicating light serially connected with a thermal switch across a voltage source. The output of the second transistor is connected to a heating element associated with the thermal switch to actuate the switch and to control the indicating light.

Advantageously the thermal switch may be normally open or normally closed, depending upon whether the modulating voltage is a maximum at low or full fuel conditions, so that it is readily adaptable to various types of indicating systems. Moreover the use of the thermal switch prevents flickering of the light in response to vibration or swishing of the fuel in the tank. The thermal switch may include identical bimetallic strips to provide ambient temperature compensation.

The first transistor connected to the modulated voltage circuit preferably includes a high resistance between its collector and the modulated voltage circuit to isolate the transistor and to protect the transistor against failure. Additionally the high resistance prevents the drawing of any significant current from the modulated voltage circuit which would otherwise cause an inaccurate reading of the fuel level meter installed by the manufacturer.

For a better understanding of the present invention, reference may be had to the accompanying drawing which is a schematic illustration of a fuel indicating system of an automobile incorporating the signaling apparatus according to the present invention.

Referring now to the drawing, there is illustrated a conventional fuel level sensing device 10 mounted in a fuel tank 11 of an automobile (not shown) or other piece of equipment. The fuel level sensing devise may be of any commercial type; however, the illustrated fuel level sensing device 10 is of the rheostat type having zero voltage at tank empty conditions and including a resistance element 12 and a movable contact 13 connected to be operated by a float 14 riding on the surface of the fuel 15 in the fuel tank 11. The movable contact 13 is grounded, as indicated at 16, and the resistance element 12 has one end connected to an external terminal 17.

As installed by the car manufacturer, the fuel level sensing device 10 is serially connected with a fuel level indicating meter 19 across a voltage source 20, here illustrated as a car battery. The negative terminal of the battery 20 is grounded, as indicated at 21, to complete a series circuit with the fuel level sensing device 10 and the fuel level indicating meter 19. It will be understood that the voltage source 20 would normally include a constant voltage regulator in addition to the battery 20 for operation of the gaging circuits to prevent variations in the output voltage of the battery 20 from affecting the readings on the fuel level indicating meter 19. However the constant voltage regulator forms no part of the present invention and, for simplicity, it has been omitted from the drawing.

It will be seen that the fuel level sensing device 10 is of the type which provides a modulated voltage responsive to the physical level of the fuel 15 with a maximum voltage when the fuel tank 11 is full and with a zero voltage when the fuel tank 11 is empty. Moreover there is a critical modulated voltage provided at the terminal 17 of the fuel level sensing device 10 and representing a critical low level of fuel at which it would be desirable to provide a visual or audible warning to the operator of the automobile.

In accordance with the present invention there is provided an improved signaling apparatus, generally illustrated at 25 adapted for connection across the voltage source 20, as indicated by the terminals 20a and 21a, and having a terminal 17a connected to the modulated voltage circuit to actuate when the critical value of the modulated voltage is reached. More specifically, the signaling apparatus 25 includes a potentiometer 26 connected across the voltage source 20 for providing a selectively variable comparison or control voltage selectably variable relative to the critical value of the modulated voltage. The potentiometer 26 includes a resistance winding 27 connected between terminals 20a and 21a and a movable contact 28 which can selectively be set for any desired comparison voltage value.

For comparing the selected comparison voltage of the potentiometer with the modulated voltage, there is provided a first transistor 30 having its base connected through a high impedance 31, which may be, for example, a 5K resistance, to the modulated voltage terminal 17a of the fuel level sensing device 10. The emitter of the transistor 30 is connected to the movable contact 38 and the output load from the collector of the transistor 30 is connected to ground through a suitable impedance such as a resistance 33. As previously indicated, the voltage to the base of the transistor 30 will be zero when the fuel tank 11 is empty and will be at some positive potential above ground when the fuel tank 11 is full. The amplitude of this maximum voltage will depend upon the relative values of resistance of the resistance element 12 and the fuel level indicating meter 19. Moreover it will be understood that the potentiometer 26 will be selectively set to read at a comparison voltage equal to the critical value of the modulated voltage at which it is desired for the indicator to operate. When the comparison voltage from the potentiometer 26 is higher than the modulated voltage, the transistor 30 is nonconducting and no current will flow through the transistor 30; therefore there will be no voltage drop across the resistance 33. However once the modulated voltage drops to a value equal or below the critical value of the signaling system, the potential difference between the emitter and base becomes less positive, that is, more negative, to render the transistor 30 conducting, and current will flow in the load circuit of the transistor passing through the resistance 33.

To amplify the output of the transistor 30, there is provided a second transistor 35 adapted to be controlled by the voltage drop across the resistance 33. More specifically, the base of the transistor 35 is connected to the collector of the transistor 30, and the emitter of the transistor 35 is connected to ground, to place the control of the transistor 30 across the resistance 33. When a voltage drop occurs across the resistance 33, the transistor 35 will become conducting and will cause current to flow in its load circuit. The transistors 30 and 35 are selected to provide a high gain so that the point of current cutoff or flow will be quite sharp. The output or load circuit of the transistor 35 controls the signal device of the signal system.

It is understood that the load circuit of the transistor 35 can control any suitable indicator. However, in the illustrated embodiment, to provide a visual indication of a low fuel condition, there is provided an incandescent signal light 37 serially connected with a resistance 38 and a thermal switch 39 across the voltage source 20. The load circuit of the transistor 35 includes a heating element 40 associated with a bimetal strip 41 in the thermal switch 39 to actuate the thermal switch 39 in response to the conducting of the transistor 35. The thermal switch 39 in the illustrated embodiment is of the normally open type, and heating of the heating element 40 at a low fuel condition is effective to close the switch and operate the indicating light 37.

Advantageously the signal system can be readily adapted for use with a fuel level sensing device having zero modulated voltage at full fuel and maximum modulate voltage at tank empty conditions merely by providing a normally closed thermal switch in place of the normally open thermal switch 39. The thermal switch would be open at high fuel levels by the heating action of the heating element 40. However, when the critical voltage is raised to the preselected comparison voltage so that the output of the transistor 35 is cut off, then the heating element 40 would cool, closing the thermal switch and lighting the signal lamp 37.

By providing a short bimetal contact strip 41, the natural frequency of the bimetal strip is very high and difficulties from vibrations which might result in lighting the lamp 37 are minimized.

In order to prevent damage to the transistor 30 when the contact 28 is at the positive side of the potentiometer 26 and the float 14 is at the tank empty position, a resistor 46 is inserted between the positive side of potentiometer 26 and the positive pole of battery 20. In one embodiment, the resistor 36 was a 100 ohm resistor.

In operation the signaling apparatus 25 may be set to provide the signal at any desired fuel level merely by adjusting the potentiometer 26 to provide a comparison voltage to render the transistor 30 conducting at the desired fuel level. The potentiometer may be readily set for any existing fuel level by first shorting out the thermal switch 39 and heater element 40 and connecting the light 37 and resistance 38 directly in the load circuit of the transistor 35 to respond immediately to the conducting condition of the transistor 35. To this end there is provided a pair of terminals 44, 45 connected respectively to the collector of the transistor 35 and to the resistance 38. The terminals 44 and 45 may be shorted by a coin, screwdriver, or other conducting member and the potentiometer 26 may be adjusted to light the lamp 37 at the then existing fuel level.

The present signaling system does not load the existing gas gage system nor interfere with its reading. Moreover it does not pass enough current through the float tank rheostat to interfere in any way with the operation of this rheostat. Advantageously this permits the present signaling apparatus to be installed on existing gasoline gage systems.

Although the present invention has been described by reference to a single embodiment thereof, it will be apparent that numerous other modifications and embodiments will be devised by those skilled in the art which will fall within the true spirit and scope of the present invention.

What is claimed as new and desired to be secured by Letters Patent of the United States is:

1. Signaling apparatus for association with an electrical condition indicating system including a sensing device providing a modulated voltage circuit responsive to a physical condition and variable between upper and lower voltage limits and including a voltage source, the physical condition having a critical point providing through said sensing device a critical voltage between the upper and lower voltage limits, said apparatus comprising:

voltage means for association with the voltage source for providing a comparison voltage relative to the critical voltage;

a first transistor switch for connection to the voltage source and connected to said voltage means and to the modulated voltage circuit to switch its load circuit between an off and on condition whenever said modulated voltage reaches said critical value; and a signal circuit controlled by said load circuit.

2. Signaling apparatus as set forth in claim 1 above wherein said signal circuit includes a second transistor switch controlled by the output of said first transistor switch, and signal means controlled by the load circuit of said second transistor.

3. Signaling apparatus as set forth in claim 1 above wherein the base of said first transistor is adapted to be connected to said modulated voltage circuit through a high impedance.

4. Signaling apparatus as set forth in claim 1 above wherein said impedance is a resistance impedance.

5. Signaling apparatus as set forth in claim 1 above wherein said voltage means is a potentiometer adapted for connection across a voltage source, and is provided with a movable contact providing for selectively varying said comparison voltage.

6. Signaling apparatus as set forth in claim 5 above wherein said contact is electrically connected to the base of said first transistor.

7. Signaling apparatus as set forth in claim 1 above wherein the load circuit of said first transistor switch includes a resistor, and said second transistor switch is connected to be controlled by the voltage drop across said resistor.

8. Signaling apparatus as set forth in claim 1 above wherein said signal circuit includes a thermal switch serially connected with a signal device for connection across a voltage source, and the load circuit of said transistor controls said thermal switch.

9. Signaling apparatus as set forth in claim 2 above wherein said signal means includes a thermal switch connected with a signal device for connection across a voltage source, and the load circuit of said second transistor switch includes a heating element for controlling said switch.

10. A fuel level warning device for use in connection wtih an electric fuel gage circuit of a motor vehicle having a fuel meter in series with and interposed between a voltage source and a fuel level sensing device producing a modulated voltage circuit responsive to the level of fuel and comprising:

a potentiometer having a resistance element adapted to be connected between a voltage source and ground and having a movable contact for providing a selectably variable comparison voltage;

a first transistor switch having its base adapted for connection to said modulated voltage circuit through a high impedance and having its collector connected to said variable contact;

an impedance connected in the load circuit of said transistor switch;

a second transistor switch connected for control by the voltage drop across the last mentioned impedance; and signal means controlled by the load circuit of said second transistor switch.

11. Signaling apparatus for association with an electrical condition indicating system including a sensing device providing a modulated voltage circuit responsive to a physical condition and variable between upper and lower voltage limits and including a voltage source, the physical condition having a critical point providing through said sensing device a critical voltage between the upper and lower voltage limits, said apparatus comprising:

means connected to the voltage source for providing a reference voltage relative to the critical voltage;

control means responsive to the modulated voltage and the reference voltage to provide a signal response between an off and an on condition whenever said modulated voltage reaches the critical value;

a signal circuit responsive to the off and on condition of said signal response for indicating when the critical point has been reached; and manually adjustable means for selectively varying said reference voltage to alter the response point of said control means thereby selectively varying the critical voltage to provide for selective variation of the critical point of said physical condition.

References Cited

UNITED STATES PATENTS

| 2,736,883 | 2/1956 | Boddy | 340—181 |
| 2,756,410 | 7/1956 | Tobias | 340—181 |

NEIL C. READ, *Primary Examiner.*

THOMAS B. HABECKER, *Examiner.*